United States Patent
Adler et al.

(10) Patent No.: US 8,984,430 B2
(45) Date of Patent: Mar. 17, 2015

(54) FEED FOR ENHANCED WEB BROWSING

(75) Inventors: Darin B. Adler, Los Gatos, CA (US); Ada Y. Chan, Santa Clara, CA (US); Steven J. Falkenburg, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 944 days.

(21) Appl. No.: 12/242,695

(22) Filed: Sep. 30, 2008

(65) Prior Publication Data
US 2010/0083158 A1    Apr. 1, 2010

(51) Int. Cl.
*G06F 3/048* (2013.01)
*G06F 17/30* (2006.01)

(52) U.S. Cl.
CPC .................. *G06F 17/3089* (2013.01)
USPC ....................................... 715/771

(58) Field of Classification Search
USPC ....................................... 715/771
See application file for complete search history.

(56) References Cited

U.S. PATENT DOCUMENTS

| | | | |
|---|---|---|---|
| 7,818,659 B2 * | 10/2010 | Kahn et al. | 715/203 |
| 7,840,527 B2 * | 11/2010 | Kahn et al. | 707/608 |
| 8,230,347 B2 * | 7/2012 | Cwajbaum | 715/738 |
| 2005/0289147 A1 * | 12/2005 | Kahn et al. | 707/10 |
| 2005/0289468 A1 * | 12/2005 | Kahn et al. | 715/738 |
| 2006/0200443 A1 * | 9/2006 | Kahn et al. | 707/1 |
| 2006/0200740 A1 * | 9/2006 | Kahn et al. | 715/500 |
| 2006/0253459 A1 * | 11/2006 | Kahn et al. | 707/10 |
| 2006/0253489 A1 * | 11/2006 | Kahn et al. | 707/102 |
| 2007/0047701 A1 * | 3/2007 | Morris | 379/100.08 |
| 2007/0083520 A1 * | 4/2007 | Shellen et al. | 707/10 |
| 2008/0082673 A1 * | 4/2008 | Dynin et al. | 709/228 |
| 2008/0126476 A1 * | 5/2008 | Nicholas et al. | 709/203 |
| 2009/0222716 A1 * | 9/2009 | Boerries et al. | 715/206 |
| 2010/0057680 A1 * | 3/2010 | Little | 707/3 |

OTHER PUBLICATIONS

Live Bookmarks—Firefox, MozillaZine Knowledge Base, published Dec. 27, 2007.*
Mozilla Firefox: RSS and Live Bookmarks, by John Bokma, published Dec. 19, 2007.*

* cited by examiner

*Primary Examiner* — William Bashore
*Assistant Examiner* — Henry Orr
(74) *Attorney, Agent, or Firm* — Blakely, Sokoloff, Taylor & Zafman LLP

(57) ABSTRACT

User input is received to create a bookmark in a web browser for a non-feed Uniform Resource Locator (URL). A web feed associated with the non-feed URL is determined. A subscription to the web feed is automatically created. An indication of new web content is received from the web feed. The bookmark for the non-feed URL is decorated to provide a visual indication of the new web content.

20 Claims, 6 Drawing Sheets

FEED FOR ENHANCED WEB BROWSING

FIELD

Embodiments of the invention relate to web browsing, and more particularly to displaying information associated with new content on a web browser.

BACKGROUND

A web feed is a data format used for providing users with frequently updated content (e.g., web content). Content distributors supply a web feed, allowing users to subscribe to it. Making a collection of web feeds accessible in one spot is known as aggregation, which is frequently performed by an Internet aggregator. A web feed may also be referred to as a news feed or syndicated feed.

With web feeds, a content provider typically publishes a feed link on their site to which end users can register (e.g., using a feed aggregator program, feed reader, news reader, etc., running on their own machines). The aggregator program is designed to ask the servers in its feed list if they have new content; if so, the aggregator either makes a note of the new content or downloads it. Aggregators can be scheduled to check for new content periodically.

Web-based aggregators are frequently maintained as bookmarks in a web browser. Selecting (e.g., by clicking) a web feed bookmark causes the web browser to access a feed page for the web feed (e.g., having a URL beginning with "feed://") as opposed to a standard (or non-feed) web page (e.g., having a URL beginning with "http://"). Feed pages may display full content, but frequently display only a summary of the new content. Currently, users of web browsers have no way of identifying new content on a standard (or non-feed) web page without accessing and viewing the particular web page.

SUMMARY OF THE DESCRIPTION

In various embodiments of the invention, user input is received to create a bookmark in a web browser for a non-feed Uniform Resource Locator (URL). A web feed associated with the non-feed URL is determined. A subscription to the web feed is, in various embodiments, automatically created. An indication of new web content is received from the web feed. The bookmark for the non-feed URL is decorated to provide a visual indication of the new web content. The decoration can be, for example, a number representing a count of new items associated with the new web content.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

In general, embodiments described herein describe methods, apparatuses, and systems for providing web browsers with contextual information regarding new content for non-feed Uniform Resource Locators (URLs). When a user creates a bookmark in a web browser for a non-feed URL, the web browser determines whether there is a web feed associated with the non-feed URL; this determination may be done automatically without user interaction or may be done in response to a user request to make the determination. For example, a particular website may have an associated RSS (Really Simple Syndication) feed. The RSS feed will have a different URL than the regular/main website URL. The HTML (Hyper-Text Markup Language) code for the main website includes a pointer to any feed URLs associated with the website, such as an RSS feed URL.

Having determined the URL for an associated feed page, the browser, in various embodiments, automatically subscribes to the web feed. In other embodiments, the browser may subscribe to the feed in response to a user request. The subscription to the web feed is linked to the newly created bookmark. The web feed is refreshed/reloaded periodically during browsing to check for new content. When an indication of new web content is received from the web feed, the bookmark for the non-feed URL is decorated to provide a visual indication of the new web content.

Figure 1:
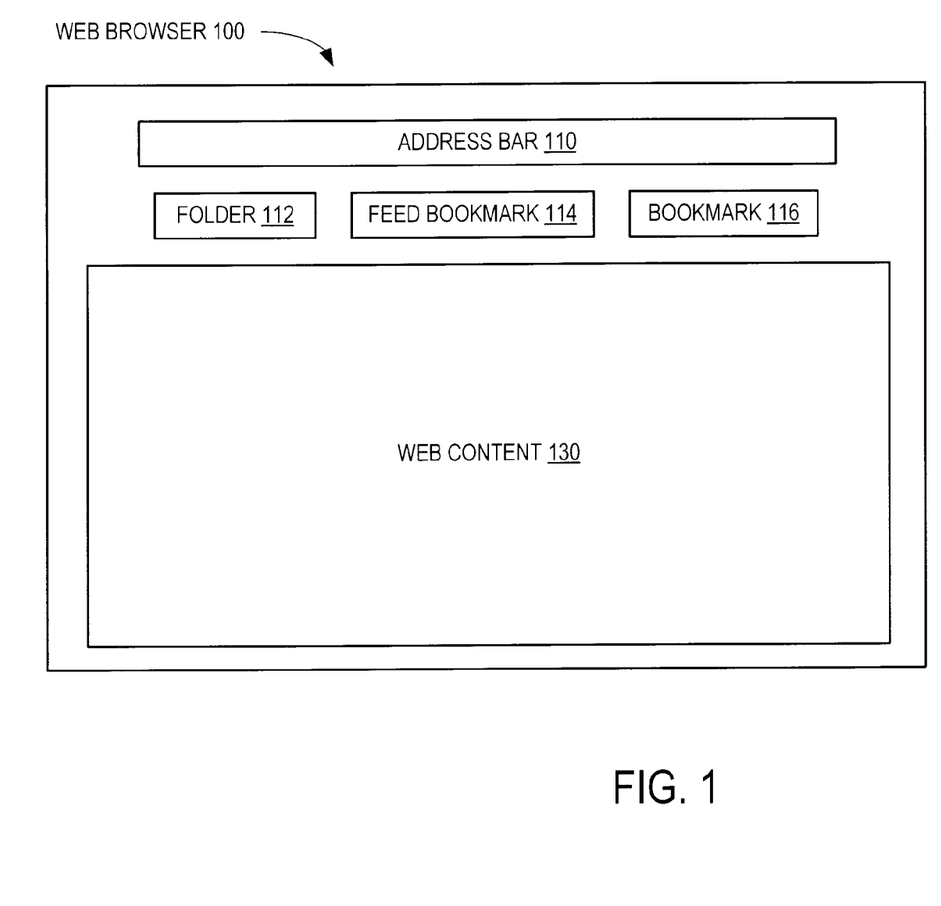
FIG. 1 is a block diagram illustrating a view of a web browser.

FIG. 1 is a block diagram illustrating a web browser display. Web browser 100 includes an address bar 110 for entering a Uniform Resource Locator (URL), one or more bookmark folders 112, one or more feed bookmarks 114, one or more standard bookmarks 116, and a display of web content 130 associated with a particular web page. Folder 112 may contain links to multiple bookmarked web pages. Thus, by selecting the folder 112, a dropdown list, for example, might display the list of bookmarked web pages in folder 112. Selecting bookmark 116 causes the web browser to navigate to the web page associated with bookmark 116 and display the content in the web content area 130 of the browser. Similarly, selecting feed bookmark 114 causes the web browser to navigate to the web feed page associated with feed bookmark 116.

Figure 2A:
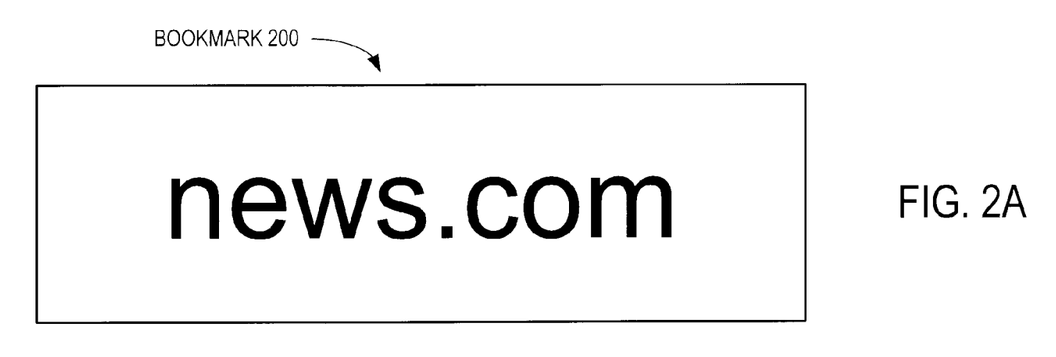
FIGS. 2A-B are block diagrams illustrating bookmarks in a web browser. The word "bookmarks" includes favorites and other recorded URLs.
Figure 2B:
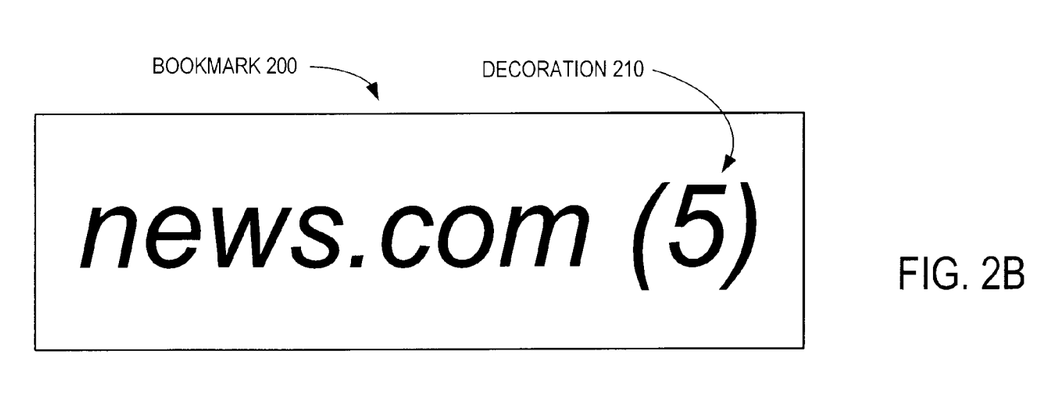

FIGS. 2A-B are block diagrams illustrating a bookmark in a web browser. In particular, the bookmark is intended to represent a non-feed website such as, for example, "news.com." The bookmark icon 200 in FIG. 2A simply includes a label (e.g., "news.com") to identify the bookmarked website. Typically, the label can be chosen by the user when bookmarking the web page.

FIG. 2B illustrates an example of a decoration used to indicate new web content associated with the bookmark "news.com." Decoration 210 is a number (in this case, the number 5) in parenthesis that identifies, for example, the number of new articles or links on the "news.com" website. Additionally, the entire "news.com" label is displayed in italics to distinguish the fact that there is new and/or unviewed content on the website. In some embodiments, the decoration may be only the use of italics.

The decoration of the bookmark label can take any of a number of forms to indicate the presence of new web content in various embodiments. For example, instead of a number specifying an exact number of new articles, there may be a binary indicator (e.g., a star, a flag or other icon, etc.) denoting the presence of new content. Part of the label or the entire label can be italicized, bolded, underlined or otherwise highlighted using colors, shading, etc. Indeed, any type of visual decoration that allows a user to distinguish the presence of new web content associated with bookmark 200 can be used in one or more embodiments.

Figure 3:
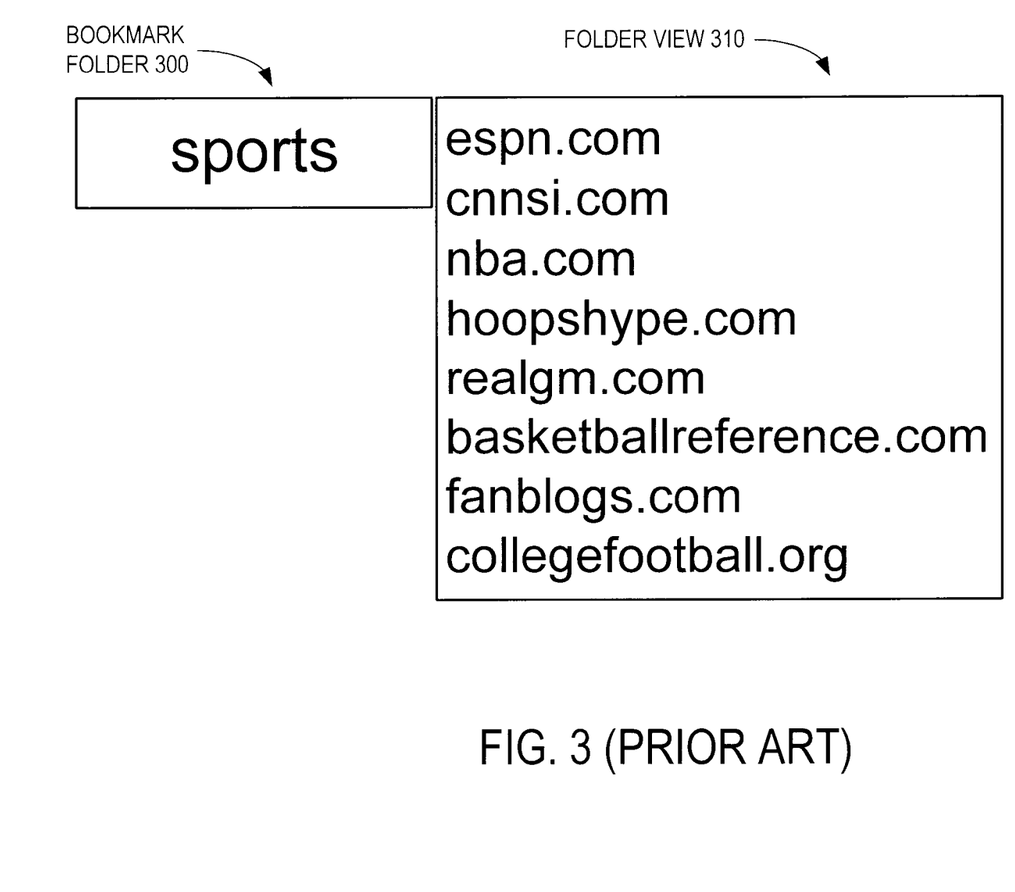
FIG. 3 is a block diagram illustrating a prior art bookmark folder and a folder view in a web browser.

FIG. 3 is a block diagram illustrating a prior art bookmark folder and a folder view in a web browser. Bookmark folder 300 includes a label for the folder (e.g., "sports"). When a user selects (e.g., clicks) on folder 300, a folder view 310 is displayed showing a list of one or more bookmarked web pages in folder 300. In the example of FIG. 3, folder view 310 includes eight bookmarked links.

Figure 4:
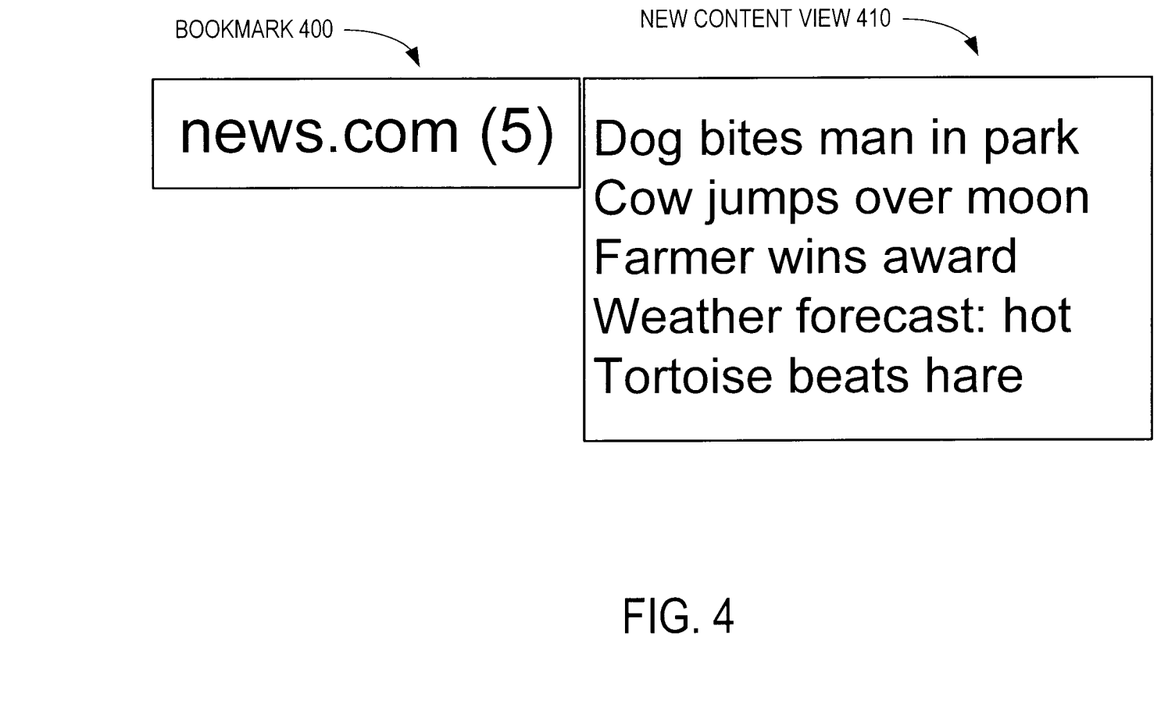
FIG. 4 is a block diagram illustrating a decorated bookmark and a new content view in a web browser.

FIG. 4 is a block diagram illustrating a decorated bookmark and a new content view in a web browser. In contrast to the prior art, bookmark 400 is a bookmark for a non-feed web page and is endowed with the ability to display a visual indication (via decorating the bookmark icon) of the presence of new web content for that particular bookmarked web page. As shown, bookmark 400 has been decorated to indicate the presence of five new articles/links for the "news.com" website. Again in contrast to the prior art, selecting (e.g., by clicking) bookmark 400 results in the display of a new content view 410. In other words, rather than displaying a list of bookmarks in response to selection of a bookmark folder (e.g., FIG. 3), embodiments described herein display a list of any new content associated with the bookmarked web page (e.g., bookmark 400). In some embodiments, as illustrated in FIG. 4, new content view 410 displays captions, headlines and/or titles corresponding to new articles or links on the bookmarked web page.

Figure 5:
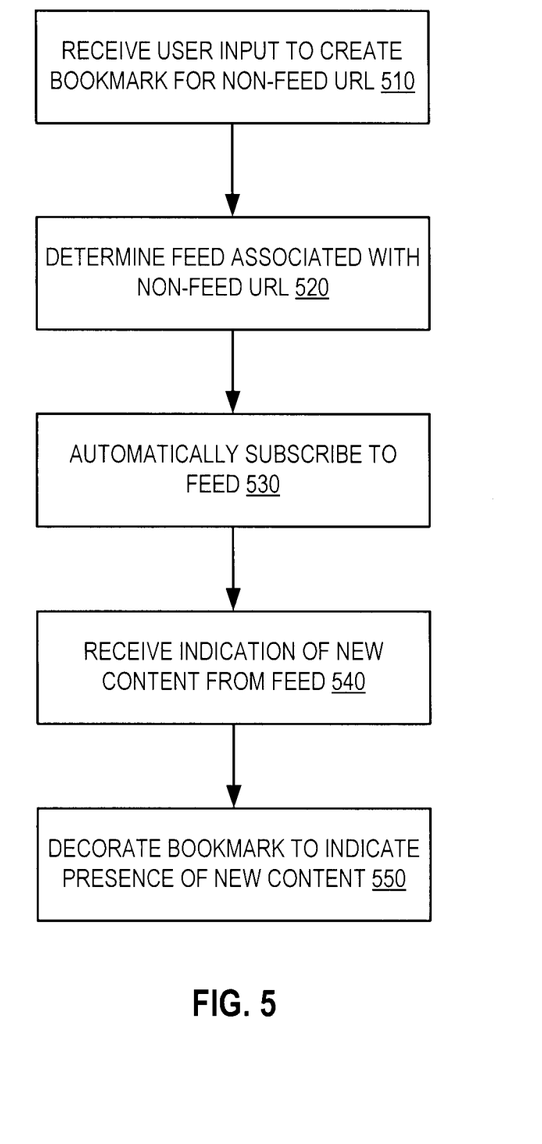
FIG. 5 is a flow diagram illustrating a process for displaying indications of new web content according to various embodiments.

FIG. 5 is a flow diagram illustrating a process for displaying indications of new web content according to various embodiments. User input is received to create a bookmark for a non-feed URL 510. A web feed associated with the non-feed URL is determined 520. For example, the web browser could search the HTML code of the non-feed web page for a pointer to a feed URL. Having determined an associated feed, the browser automatically subscribes to the feed 530. The feed may then be linked by the browser to the newly created bookmark.

Indications of new content are received from the feed 540. The indications might include some type of binary indication that new content is available or the indication might involve receiving the actual new content (e.g., news article, etc.). The bookmark for the non-feed URL is subsequently decorated to visually indicate to a user the presence of new web content for the bookmarked web page 550. As discussed herein, the decoration of the bookmark can be embodied in any number of ways, including, but not limited to, binary indicators, highlights, graphics, icons, text alterations (e.g., style, color, font, etc.), counts identifying new content, and the like.

Figure 6:
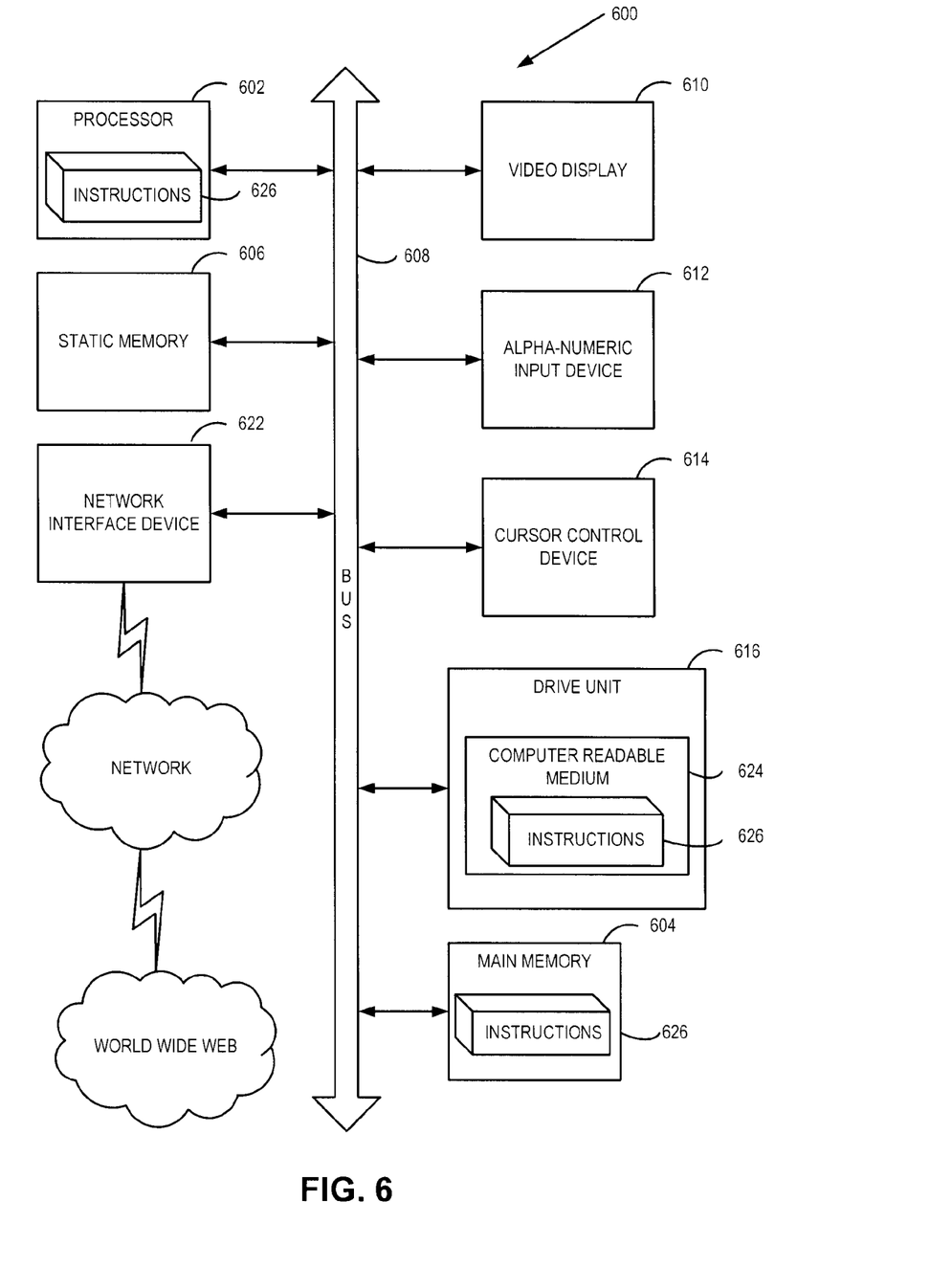
FIG. 6 is a block diagram illustrating a suitable computing environment for practicing various embodiments described herein.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), and a cursor control device 614 (e.g., a mouse)

The secondary memory 616 may include a machine-readable storage medium (or more specifically a computer-readable storage medium) 624 on which is stored one or more sets of instructions (e.g., software 626) embodying any one or more of the methodologies or functions described herein. The software 626 may also reside, completely or at least partially, within the main memory 604 and/or within the processing device 602 during execution thereof by the computer system 600, the main memory 604 and the processing device 602 also constituting machine-readable storage media. The software 626 may further be transmitted or received over a network via the network interface device 622.

While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine readable storage medium" shall accordingly be taken to include, but not be limited to, solid-state memories, and optical and magnetic media.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer readable medium, which provides content that represents instructions that can be executed. The content may result in a computer performing various functions/operations described herein. A computer readable (or machine readable or electronically accessible) medium includes any mechanism that provides (i.e., stores and/or transmits) information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for providing enhanced web content information in a web browser, the method comprising:
   receiving, by a computer, user input to create a bookmark in a web browser for a non-feed Uniform Resource Locator (URL);
   creating the bookmark in the web browser, wherein user selection of the bookmark causes the web browser to navigate to the non-feed URL;
   in response to the creation of the bookmark for the non-feed URL,
      determining, by the computer, a web feed associated with the non-feed URL by searching markup language of a web page located at the non-feed URL for a pointer to a feed URL, and
      automatically subscribing to the web feed using the feed URL determined to be associated with the non-feed URL;
   receiving an indication of new web content from the web feed; and
   decorating the bookmark for the non-feed URL to provide a visual indication of the new web content indicated by the web feed.

2. The method of claim 1, wherein decorating the bookmark to provide the visual indication further comprises decorating the bookmark with a number representing a count of items associated with the new web content.

3. The method of claim 1, wherein decorating the bookmark further comprises one or more of decorating the bookmark with a binary visual indicator or displaying a meter indicating a relative amount of new web content.

4. The method of claim 1, further comprising:
   receiving user input requesting display of additional information associated with the decorated bookmark; and
   displaying a list including a summary for each item of new web content.

5. The method of claim 4, further comprising:
   providing a direct link to each item of new web content.

6. An article of manufacture comprising a non-transitory machine readable storage medium having content to provide instructions to result in a machine performing operations including:
   receiving user input to create a bookmark in a web browser for a non-feed Uniform Resource Locator (URL);
   creating the bookmark in the web browser, wherein user selection of the bookmark causes the web browser to navigate to the non-feed URL;
   in response to the creation of the bookmark for the non-feed URL,
      determining a web feed associated with the non-feed URL by searching markup language of a web page located at the non-feed URL for a pointer to a feed URL, and
      automatically subscribing to the web feed using the feed URL determined to be associated with the non-feed URL;
   receiving an indication of new web content from the web feed; and
   decorating the bookmark for the non-feed URL to provide a visual indication of the new web content indicated by the web feed.

7. The article of manufacture of claim 6, wherein decorating the bookmark to provide the visual indication further comprises decorating the bookmark with a number representing a count of items associated with the new web content.

8. The article of manufacture of claim 6, wherein decorating the bookmark further comprises one or more of decorating the bookmark with a binary visual indicator or displaying a meter indicating a relative amount of new web content.

9. The article of manufacture of claim 6, further comprising:
   receiving user input requesting display of additional information associated with the decorated bookmark; and
   displaying a list including a summary for each item of new web content.

10. The article of manufacture of claim 9, further comprising:
    providing a direct link to each item of new web content.

11. An apparatus, comprising:
    a processing device to execute a set of instructions that causes the apparatus to perform operations including
    receiving user input to create a bookmark in a web browser for a non-feed Uniform Resource Locator (URL);
    creating the bookmark in the web browser, wherein user selection of the bookmark causes the web browser to navigate to the non-feed URL;
    in response to the creation of the bookmark for the non-feed URL,
       determining a web feed associated with the non-feed URL by searching markup language of a web page located at the non-feed URL for a pointer to a feed URL, and automatically subscribing to the web feed using the feed URL determined to be associated with the non-feed URL;
receiving an indication of new web content from the web feed; and
decorating the bookmark for the non-feed URL to provide a visual indication of the new web content indicated by the web feed.

12. The apparatus of claim 11, wherein decorating the bookmark to provide the visual indication further comprises means for decorating the bookmark with a number representing a count of items associated with the new web content.

13. The apparatus of claim 11, wherein decorating the bookmark further comprises decorating the bookmark with a binary visual indicator or displaying a meter indicating a relative amount of new web content.

14. The apparatus of claim 11, wherein the processing device executes a set of instructions that causes the apparatus to perform operations further comprising:
receiving user input requesting display of additional information associated with the decorated bookmark; and
displaying a list including a summary for each item of new web content.

15. The apparatus of claim 14, wherein the processing device executes a set of instructions that causes the apparatus to perform operations further comprising:
providing a direct link to each item of new web content.

16. A non-transitory computer readable storage medium storing instructions, which when executed by a processing device, cause the processing device to perform a method comprising:
receiving user input to create a bookmark in a web browser for a non-feed Uniform Resource Locator (URL);
creating the bookmark in the web browser, wherein user selection of the bookmark causes the web browser to navigate to the non-feed URL;
in response to the creation of the bookmark for the non-feed URL,
determining a web feed associated with the non-feed URL by searching markup language of a web page located at the non-feed URL for a pointer to a feed URL, and
automatically subscribing to the web feed using the feed URL determined to be associated with the non-feed URL;
receiving an indication of new web content from the web feed; and
providing to the user a notification of the new web content indicated by the web feed.

17. The non-transitory machine readable storage medium of claim 16, the method further comprising:
receiving user input requesting display of additional information associated with the notification; and
displaying a list including a summary for each item of new web content.

18. The non-transitory machine readable storage medium of claim 17, the method further comprising:
providing a direct link to each item of new web content.

19. The non-transitory machine readable storage medium of claim 16, wherein the notification comprises decorating the bookmark for the non-feed URL.

20. The non-transitory machine readable storage medium of claim 16, wherein the notification comprises displaying a list of at least one of: headlines, captions, or titles corresponding to new web content associated with the bookmarked page.

* * * * *